US012703336B2

(12) United States Patent
Merza et al.

(10) Patent No.: US 12,703,336 B2
(45) Date of Patent: Aug. 11, 2026

(54) METHOD FOR DETERMINING AN ACTUAL MASS OF A VEHICLE, CONTROL SYSTEM IMPLEMENTING SUCH A METHOD, AND VEHICLE COMPRISING SUCH A CONTROL SYSTEM

(71) Applicant: KNORR-BREMSE SYSTEME FUER NUTZFAHRZEUGE GMBH, Munich (DE)

(72) Inventors: Valér Merza, Szentendre (HU); Daniel Thum, Munich (DE); Tamas Komlos, Csavoly (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 100 days.

(21) Appl. No.: 18/836,512

(22) PCT Filed: Mar. 7, 2023

(86) PCT No.: PCT/EP2023/055744
§ 371 (c)(1),
(2) Date: Aug. 7, 2024

(87) PCT Pub. No.: WO2023/186467
PCT Pub. Date: Oct. 5, 2023

(65) Prior Publication Data

US 2025/0153692 A1 May 15, 2025

(30) Foreign Application Priority Data

Mar. 31, 2022 (EP) .................................... 22166097

(51) Int. Cl.
*B60T 8/18* (2006.01)

(52) U.S. Cl.
CPC .............. *B60T 8/18* (2013.01); *B60T 8/1806* (2013.01); *B60T 2250/02* (2013.01); *B60T 2250/04* (2013.01)

(58) Field of Classification Search
CPC ...... B60T 8/18; B60T 8/1806; B60T 2250/02; B60T 2250/04
See application file for complete search history.

(56) References Cited

U.S. PATENT DOCUMENTS 5,415,466 A * 5/1995 Breen ..................... B60T 13/66 303/9.62
5,482,359 A * 1/1996 Breen ...................... B60T 8/58 303/9.69

(Continued)

FOREIGN PATENT DOCUMENTS

DE 4228413 A1 3/1994
EP 2799303 A1 11/2014

(Continued)

OTHER PUBLICATIONS

EPO Office Action issued in corresponding patent application EP 22 166 097.0-1009 on Sep. 9, 2025.

(Continued)

*Primary Examiner* — Lindsay M Low
*Assistant Examiner* — Susan E Scharpf
(74) *Attorney, Agent, or Firm* — NORTON ROSE FULBRIGHT US LLP

(57) ABSTRACT

A method for determining an actual mass of a vehicle, includes: determining a reference relationship of a deceleration of the vehicle having a known mass with respect to a brake demand; executing braking with a predetermined brake demand; detecting an actual deceleration of the vehicle when using the predetermined brake demand; determining an actual relationship of the actual deceleration of the vehicle with respect to the predetermined brake demand;

(Continued)

and determining the actual mass of the vehicle by correlating the actual relationship and the reference relationship.

19 Claims, 2 Drawing Sheets

(56) References Cited

U.S. PATENT DOCUMENTS

| | | | | |
|---|---|---|---|---|
| 6,099,085 | A * | 8/2000 | Eckert | B60T 13/683 303/9.69 |
| 6,332,354 | B1 * | 12/2001 | Lalor | B60T 8/00 73/121 |
| 6,446,024 | B1 * | 9/2002 | Leimbach | B60W 40/13 73/146 |
| 2013/0138288 | A1 * | 5/2013 | Nickolaou | B60W 40/13 701/99 |
| 2014/0244120 | A1 * | 8/2014 | Fujii | B60W 10/11 701/58 |
| 2015/0212107 | A1 * | 7/2015 | Sannodo | B60W 40/107 702/141 |
| 2016/0063864 | A1 * | 3/2016 | Ohsugi | B60W 30/085 701/301 |
| 2024/0053187 | A1 * | 2/2024 | van Thiel | G01G 19/086 |

FOREIGN PATENT DOCUMENTS

| | | | |
|---|---|---|---|
| JP | H0338458 | A | 2/1991 |
| KR | 20170061284 | A | 6/2017 |

OTHER PUBLICATIONS

Regulation No. 13 of the Economic Commission for Europe of the United Nations (UN/ECE) "ECE R13, Revision 8", Uniform provisions concerning the approval of vehicles of categories M, N and O with regard to braking, Official Journal of the European Union (2016).

Federal Motor Vehicle Safety Standard No. 121 "FMVSS No. 121" issued on Oct. 1, 2011.

International Search Report for PCT/EP2023/055744, issued Jun. 27, 2023.

* cited by examiner

METHOD FOR DETERMINING AN ACTUAL MASS OF A VEHICLE, CONTROL SYSTEM IMPLEMENTING SUCH A METHOD, AND VEHICLE COMPRISING SUCH A CONTROL SYSTEM

FIELD OF THE INVENTION

The present invention relates to a method for determining an actual mass of a vehicle, a control system implementing such a method, and a vehicle comprising such a control system, in particular, for a vehicle without load dependent brake force control.

BACKGROUND INFORMATION

An actual load, in particular, an overall mass or an overall weight of a vehicle or of a vehicle combination, is an important input information for various vehicle control systems. This information can be used for an engine control, a brake control, a vehicle stability control, a suspension control, etc. and, also, for a fleet management system.

Hitherto, on the one hand, the actual load of the vehicle or vehicle combination has been determined by an application of sensors measuring physical characteristics proportional to the actual load to one or more axles of the vehicle or vehicle combination. Such sensors were, e.g., a pressure transducer or a position sensor. However, such sensors, related interfaces, and an additional installation effort increase the system costs.

On the other hand, as, e.g., discussed in DE 42 28 413 A1, the actual load or the actual mass have been estimated by current engine and transmission control parameters, such as a longitudinal acceleration in direction of travel of the vehicle in function of a drive torque. However, the current engine and transmission control parameters necessary for calculating the drive torque are not always available since, e.g., a standard data communication between a truck and a trailer does not have all of the necessary information.

SUMMARY OF THE INVENTION

Therefore, an object underlying the invention is to provide an option for determining the load or the overall mass or weight of a vehicle or vehicle combination in an economic manner without the need of additional sensors.

The object may be achieved by a method according to the description herein, a control system according to the description herein and a vehicle according to the description herein. Advantageous further developments are included in the further embodiments and descriptions herein.

According to an aspect of the invention, a method for determining an actual mass of a vehicle comprises the steps: determining a reference relationship of a deceleration of the vehicle having a known mass with respect to a brake demand, executing braking with a predetermined brake demand, detecting an actual deceleration of the vehicle when using the predetermined brake demand, determining an actual relationship of the actual deceleration of the vehicle with respect to the predetermined brake demand, and determining the actual mass of the vehicle by correlating the actual relationship and the reference relationship.

The actual deceleration can be detected by a velocity sensor which is usually provided in cars at the present stage or, if provided, directly by an acceleration sensor. If the velocity sensor is used for the detection of the actual deceleration, an elapsed time during deceleration has to be considered.

By such a method, the actual weight, in particular, the actual mass of the vehicle can be determined without additional sensors in an economic manner. When knowing the weight of the vehicle or of the vehicle combination itself, the weight or the mass of the load of the vehicle can also be easily determined.

In an advantageous further development of the method, the reference relationship is determined by the steps: determining a reference mass of the vehicle, executing a reference braking of the vehicle with a predetermined brake demand, detecting a deceleration of the vehicle having the reference mass depending on the predetermined brake demand, determining the reference relationship by correlating the deceleration of the vehicle and the predetermined brake demand.

By this further development, the reference relationship can be determined in an easy and exact manner for a vehicle or a vehicle combination.

In an advantageous implementation of the method, the reference relationship of the deceleration of the vehicle is determined based on an official minimum requirement for a relationship of the deceleration of the vehicle and the brake demand.

Since the brake system is usually configured to fulfill the official minimum requirement, the reference relationship can easily be determined in a sufficient precision.

According to a further advantageous implementation of the method, a range of the brake demand is determined such that the reference relationship and the actual relationship are respectively linear and expressed by a slope of a straight line in a diagram having an abscissa indicating the brake demand and an ordinate indicating the deceleration, and the actual mass is calculated based on the reference mass, a slope of a straight line expressing the reference relationship, and a slope of a straight line expressing the actual relationship.

When determining the range of the brake demand such that the reference relationship and the actual relationship are respectively linear, the actual mass can be easily determined by the previously determined reference mass and the slope of the reference relationship and the actual relationship.

According to a yet further advantageous implementation of the method, the range of the brake demand is defined such that no blocking of wheels of the vehicle occurs.

By the determination of the range of the brake demand in this manner, one important disturbing factor for preventing the linear relationships between the brake demand and decelerations can easily be excluded in order to achieve an exact result.

In an advantageous implementation of the method, the brake demand is defined by a brake actuation force of a brake of the vehicle.

By this definition, the brake demand can be defined exactly without multiple influencing variables.

In another advantageous implementation of the method, the brake demand is defined by a pressure of an operating fluid actuating on a brake actuator of a brake of the vehicle.

In case of the application of fluid driven brake actuators, the pressure of the operating fluid can be detected easily and, therefore, the brake demand can be determined easily.

Due to another advantageous implementation of the method, the pressure is an output pressure of a trailer control module.

If directly available, the output pressure of the trailer control module can easily be provided for defining the brake demand.

In another advantageous implementation of the method, the brake demand is defined by an operating current of an electric brake actuator of a brake of the vehicle.

In case of the application of electrically driven brake actuators, the operating current can be detected easily and, therefore, the brake demand can be determined easily.

In a further advantageous implementation of the method, the operating current is based on an electrical brake demand or an electrical trailer brake demand sent by a towing vehicle.

The electrical trailer brake demand can be easily used for defining the brake demand and this way of transmitting the brake demand is quicker compared to the transmission of the brake demand via pressure so that this transmission may be better from a legal point of view.

In a further advantageous implementation of the method, the known mass is a maximum permissible mass of the vehicle.

By this determination, a result as exact as possible for the determined actual mass can be achieved.

Due to another advantageous implementation of the method, the actual deceleration of the vehicle is detected by a wheel-based vehicle speed signal.

Since the wheel-based vehicle speed signal is usually available for a brake control system or another vehicle control system, there is no additional effort necessary which can prevent further components and increased costs.

According to a further aspect of the invention, a control system is configured to implement a method according to anyone of the preceding claims.

By such a control system, the actual weight, in particular, the actual mass, of the vehicle can be determined without additional sensors in an economic manner. When knowing the weight of the vehicle or of the vehicle combination itself, the weight or the mass of the load of the vehicle can also be determined.

In an advantageous implementation of the control system, it comprises an acceleration sensor configured to detect an acceleration in direction of travel of the vehicle.

By the provision of this acceleration sensor, the deceleration of the vehicle can be detected directly such that the actual mass can be determined from the relationships more simply.

According to a yet further aspect of the invention, a vehicle comprises such a control system.

For such a vehicle, the actual weight, in particular, the actual mass, of the vehicle can be determined without additional sensors in an economic manner. When knowing the weight of the vehicle or of the vehicle combination itself, the weight or the mass of the load of the vehicle can also be determined.

Below, the invention is elucidated by embodiments referring to the attached drawings.

DETAILED DESCRIPTION

Figure 1:
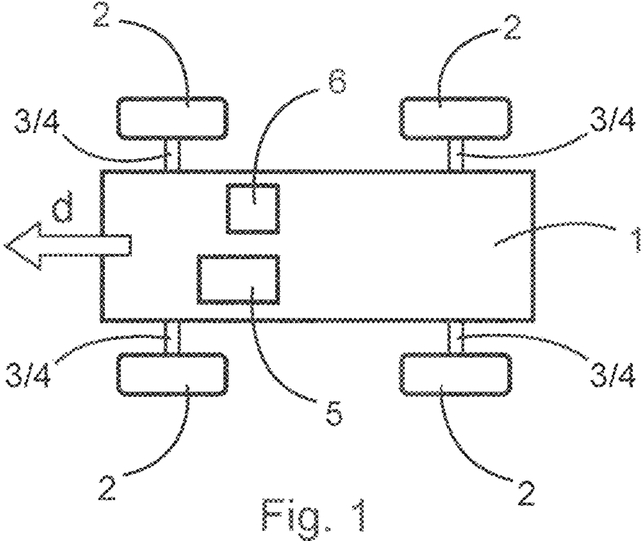
FIG. 1 shows a principle illustration of a vehicle according to the invention.

FIG. 1 shows a principle illustration of a vehicle 1, in particular a towing vehicle. The vehicle 1 comprises four wheels 2 respectively provided with a brake 3. The brakes 3 are respectively provided with a brake actuator 4 which is actuated by an operating fluid having an adjustable pressure. In an alternative embodiment, the vehicle 1 consists of a vehicle combination of tractor unit and a trailer or of another combination. In further alternative embodiments, the brake actuators 4 respectively comprise an electromechanical brake actuator and are actuated by electric current.

The vehicle 1 further comprises a control system 5 configured to implement a method according to the invention. Additionally, the vehicle 1 comprises an acceleration sensor 6 configured to detect a deceleration of the vehicle 1 in a direction of travel d of the vehicle 1. In alternative embodiments, the vehicle 1 is not provided with the acceleration sensor 6 but with a velocity sensor and a device for detecting time, and the deceleration of the vehicle 1 is determined from a wheel-based vehicle speed signal, e.g., used by a brake control system or another vehicle control system.

Figure 2:
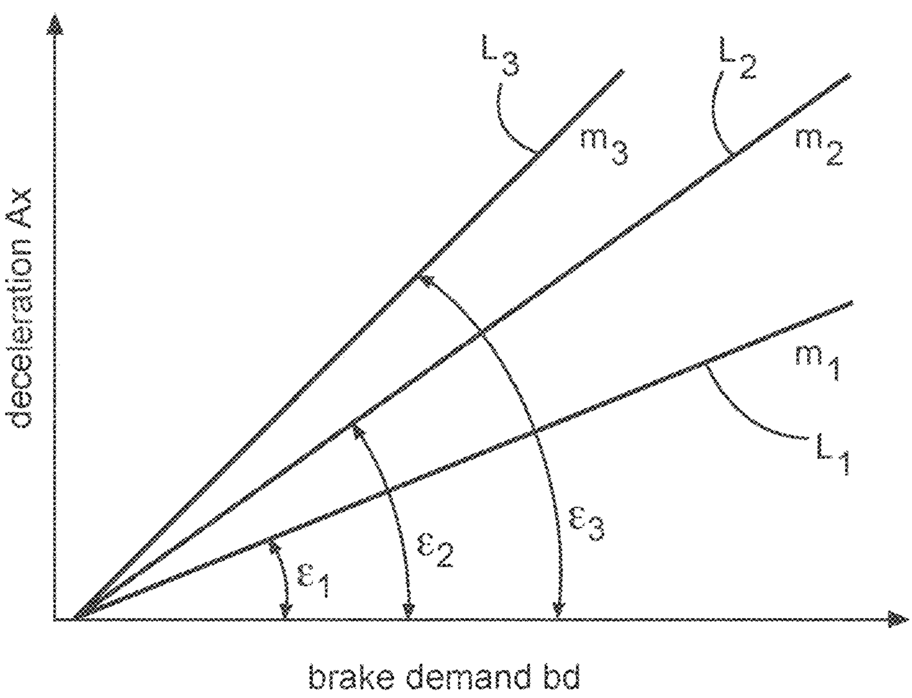
FIG. 2 shows a diagram illustrating various relationships of a deceleration with respect to a brake demand.

FIG. 2 shows a diagram illustrating various relationships of a deceleration Ax with respect to a brake demand bd. The diagram has an abscissa indicating the brake demand bd and an ordinate indicating the deceleration Ax of the vehicle 1 in the direction of travel d of the vehicle 1.

Three straight lines $L_1$, $L_2$, $L_3$ indicate three different relationships of a respective deceleration Ax of the vehicle 1 with respect to the brake demand bd for three different masses $m_1$, $m_2$, $m_3$ or weights of the vehicle 1.

As long as no wheel 2 is blocking, the deceleration Ax of the vehicle 1 is directly proportional to a braking force, in particular, to a sum of braking forces of the brakes 3, more particularly to a sum of actuation forces generated by the brake actuators 4 [$A_x=f(\Sigma F_{br})$]. It can be assumed that the actuation force of the brakes 3 is directly proportional to a brake demand bd and, therefore, the deceleration $A_x$ is directly proportional to the brake demand bd. Thus, the relationships are respectively indicated by straight lines, in particular, the straight lines $L_1$, $L_2$, $L_3$ for the different masses $m_1$, $m_2$, $m_3$.

The brake demand bd defines the brake actuation force of the brake 3 of the vehicle 1. In particular, the brake demand bd is defined by a pressure of the operating fluid actuating on the brake actuator 4 of the brake 3. In alternative embodiments, an output pressure of a foot brake valve of the vehicle 1 or an output pressure of a trailer control module or valve is used for the determination of the relationship. In further alternative embodiments, with the electromechanical brake actuator, the brake demand and, therefore, the brake actuation force are defined by an operating current of an electric brake actuator 4 of the brake 3 of the vehicle 1, or by an electrical brake demand in the vehicle 1 or an electrical trailer brake demand sent by a towing vehicle, in particular, via a bus system, more particular, via a communication network like CAN specified in ISO 11992.

Since, as mentioned above, the deceleration $A_x$ is directly proportional to the brake actuation force as long as no wheel 2 is blocking, the range of the brake demand is defined such that no blocking of the wheels 2 of the vehicle 1 occurs. In alternative embodiments, the range is defined such that blocking of the wheels 2 can occur, however, the range in which blocking occurs is excluded from the determination of the actual mass.

Based on the straight lines $L_1$, $L_2$, $L_3$ defining the relationship of the deceleration $A_x$ of the vehicle 1 with respect to the brake demand bd, the relationship can be indicated by a slope $\varepsilon_i$ of the straight lines $L_1$, $L_2$, $L_3$.

$$\varepsilon_1 \times m_1 = \varepsilon_2 \times m_2 = \varepsilon_3 \times m_3 = \varepsilon_i \times m_i \tag{1}$$

wherein $m_i$ is a mass (or corresponds to a weight) of the vehicle and $m_1 > m_2 > m_3$.

From the diagram, it is to be seen that the lower the mass, the greater the deceleration for an identical defined brake demand bd.

When a reference slope $\varepsilon_r$ of a straight line is determined for a known reference mass $m_r$ in advance as a reference relationship, the actual mass $m_a$ can be determined by correlating of the actual slope $\varepsilon_a$, i.e., the actual relationship, and the reference slope $\varepsilon_r$. In particular, the actual mass $m_a$ can be calculated by the equation $$m_a = m_r \times \frac{\varepsilon_r}{\varepsilon_a} \tag{2}$$

wherein $m_a$ is the actual mass, $m_r$ is the reference mass.

$\varepsilon_a$ is the actual slope, and $\varepsilon_r$ is the reference slope.

Figure 3:
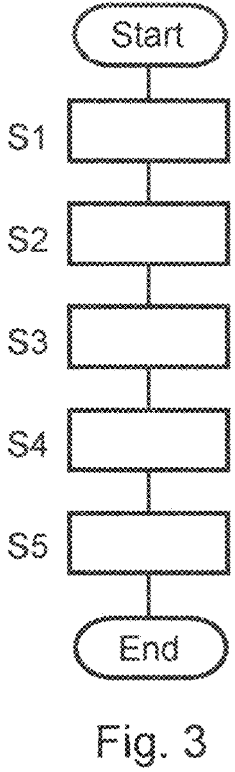
FIG. 3 shows a flowchart of a method for determining an actual mass of a vehicle according to the invention.

FIG. 3 shows a flowchart of a method for determining an actual mass of a vehicle according to the invention.

In use, in step S1, a reference relationship of a deceleration Ax of the vehicle 1 having a known mass, i.e., the reference mass $m_r$, and, therefore, a known weight, is determined with respect to a brake demand bd in advance. This reference relationship is determined by test measurements and it is indicated by the slope $\varepsilon_r$. The known mass is selected as to be a maximum permissible mass of the vehicle 1 in order to achieve a result as exact as possible, nevertheless, in alternative embodiments, also known masses less than the maximum permissible mass of the vehicle 1 are possible.

Then, in step S2, a braking with a predetermined brake demand is executed and, in step S3, an actual deceleration of the vehicle 1 when using the predetermined brake demand is detected.

Subsequently, in step S4, the actual relationship of the actual deceleration of the vehicle 1 with respect to the predetermined brake demand is determined and indicated as the actual slope $\varepsilon_a$.

A range of the brake demand is determined such that the reference relationship and the actual relationship are respectively linear, particularly such that no blocking of the wheels 2 of the vehicle 1 occurs. Alternatively, the range of the brake demand is determined such that also non-linear relationships are possible, however, such sub-ranges are excluded from the determination of the slope $\varepsilon_r$.

Finally, in step S5, the actual mass $m_a$ of the vehicle 1 is determined by correlating the actual relationship and the reference relationship, in particular, calculated by the above-described equation 2.

Figure 4:
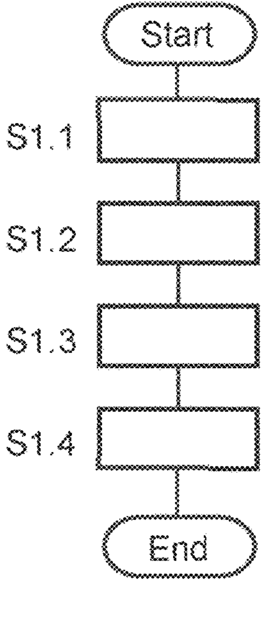
FIG. 4 shows a flowchart of a method for determining a reference relationship.

FIG. 4 shows a flowchart of a method for determining a reference relationship. In step S1.1, a reference mass $m_r$ of the vehicle 1 is determined. This determination is performed by weighing the vehicle 1 or, alternatively, by calculating based on known information.

Further, in step S1.2, a reference braking of the vehicle 1 with a predetermined brake demand bd is executed. For an enhanced determination, multiple reference brakings with different predetermined braking demands bd are executed. In step S1.3, the deceleration of the vehicle 1 having the reference mass $m_r$ is detected depending on the predetermined brake demand bd and, in step S1.4, the reference relationship is determined by correlating the deceleration Ax of the vehicle 1 and the brake demand bd.

Alternatively, the reference relationship is calculated based on known characteristics of the vehicle, in particular, based on the reference mass $m_r$, further alternatively, by a brake performance calculation, or based on an official minimum requirement for a relationship of the deceleration of the vehicle 1 and the brake demand. Using the minimum requirement for the relationship means that relationship is determined based on the minimum relationship of, e.g., a pressure of an operating fluid and a relationship of a sum of brake forces and a normal force of a lane, which minimum relationship directly corresponds to the deceleration of the vehicle 1 in a range without blocking wheels 2. The official minimum requirements are disclosed in, e.g., the Regulation No 13 of the Economic Commission for Europe of the United Nations (UN/ECE) "ECE R 13, Revision 8" or Federal Motor Vehicle Safety Standard No. 121 "FMVSS No. 121", issued on Oct. 1, 2011.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations combinations or equivalents that fall within the scope of the present invention.

THE LIST OF REFERENCE SIGNS IS AS FOLLOWS

1 vehicle
2 wheel
3 brake
4 brake actuator
5 control system
6 acceleration sensor
Ax deceleration
bd brake demand
d direction of travel
$m_a$ actual mass
$m_r$ reference mass
$m_i$ mass of vehicle
$\varepsilon_a$ actual slope
$\varepsilon_i$ slope
$\varepsilon_r$ reference slope

The invention claimed is:

1. A method for determining an actual mass of a vehicle, the method comprising:

determining a reference relationship of a deceleration of the vehicle having a known mass with respect to a brake demand;

executing braking with a predetermined brake demand;

detecting an actual deceleration of the vehicle when using the predetermined brake demand;

determining an actual relationship of the actual deceleration of the vehicle with respect to the predetermined brake demand;

determining the actual mass of the vehicle by correlating the actual relationship and the reference relationship; and controlling the vehicle using the determined actual mass;

wherein the known mass is a maximum permissible mass of the vehicle.

2. The method of claim 1, wherein the reference relationship is determined by performing the following:

determining a reference mass of the vehicle;

executing a reference braking of the vehicle with a predetermined brake demand;

detecting a deceleration of the vehicle having the reference mass depending on the predetermined brake demand; and determining the reference relationship by correlating the deceleration of the vehicle and the predetermined brake demand.

3. The method of claim 1, wherein the reference relationship of the deceleration of the vehicle is determined based on an official minimum requirement for a relationship of the deceleration of the vehicle and the brake demand.

4. The method of claim 1, wherein the brake demand is defined by a brake actuation force of a brake of the vehicle.

5. The method of claim 1, wherein the brake demand is defined by a pressure of an operating fluid actuating on a brake actuator of a brake of the vehicle.

6. The method of claim 5, wherein the pressure is an output pressure of a trailer control module.

7. The method of claim 1, wherein the brake demand is defined by an operating current of an electric brake actuator of a brake of the vehicle.

8. The method of claim 7, wherein the operating current is based on an electrical brake demand or an electrical trailer brake demand sent by a towing vehicle.

9. The method of claim 1, wherein the actual deceleration of the vehicle is detected by means of a wheel-based vehicle speed signal.

10. The method according to claim 1, wherein the controlling includes controlling, using the determined actual mass, at least one of the following:

an engine of the vehicle, braking of the vehicle, vehicle stability of the vehicle, or a suspension of the vehicle.

11. The method according to claim 10, wherein the controlling includes controlling, using the determined actual mass, the engine of the vehicle.

12. The method according to claim 10, wherein the controlling includes controlling, using the determined actual mass, the braking of the vehicle.

13. The method according to claim 10, wherein the controlling includes controlling, using the determined actual mass, the vehicle stability of the vehicle.

14. The method according to claim 10, wherein the controlling includes controlling, using the determined actual mass, the suspension of the vehicle.

15. A method for determining an actual mass of a vehicle, the method comprising:

determining a reference relationship of a deceleration of the vehicle having a known mass with respect to a brake demand;

executing braking with a predetermined brake demand;

detecting an actual deceleration of the vehicle when using the predetermined brake demand;

determining an actual relationship of the actual deceleration of the vehicle with respect to the predetermined brake demand;

determining the actual mass of the vehicle by correlating the actual relationship and the reference relationship; and controlling the vehicle using the determined actual mass;

wherein a range of the brake demand is determined such that the reference relationship and the actual relationship are respectively linear and expressed by a slope of a straight line in a diagram having an abscissa indicating the brake demand and an ordinate indicating the deceleration, and wherein the actual mass is calculated based on the reference mass, a slope of a straight line expressing the reference relationship, and a slope of a straight line expressing the actual relationship.

16. The method of claim 15, wherein the range of the brake demand is defined such that no blocking of wheels of the vehicle occurs.

17. A control system for determining an actual mass of a vehicle, comprising:

a control apparatus configured to perform the following:

determining a reference relationship of a deceleration of the vehicle having a known mass with respect to a brake demand;

executing braking with a predetermined brake demand;

detecting an actual deceleration of the vehicle when using the predetermined brake demand;

determining an actual relationship of the actual deceleration of the vehicle with respect to the predetermined brake demand;

determining the actual mass of the vehicle by correlating the actual relationship and the reference relationship; and controlling the vehicle using the determined actual mass;

wherein the known mass is a maximum permissible mass of the vehicle.

18. The control system of claim 17, wherein the control system includes an acceleration sensor configured to detect an acceleration in direction of travel of the vehicle.

19. A vehicle, comprising:

a control system for determining an actual mass of a vehicle, wherein the control system is configured to perform the following:

determining a reference relationship of a deceleration of the vehicle having a known mass with respect to a brake demand;

executing braking with a predetermined brake demand;

detecting an actual deceleration of the vehicle when using the predetermined brake demand;

determining an actual relationship of the actual deceleration of the vehicle with respect to the predetermined brake demand;

determining the actual mass of the vehicle by correlating the actual relationship and the reference relationship; and controlling the vehicle using the determined actual mass;

wherein the known mass is a maximum permissible mass of the vehicle.

* * * * *